(12) United States Patent
Gao et al.

(10) Patent No.: US 10,659,129 B2
(45) Date of Patent: May 19, 2020

(54) METHOD AND APPARATUS FOR FEEDING BACK CHANNEL STATE INFORMATION, AND A METHOD AND APPARATUS FOR TRANSMITTING DATA

(71) Applicant: China Academy of Telecommunications Technology, Beijing (CN)

(72) Inventors: Qiubin Gao, Beijing (CN); Shanzhi Chen, Beijing (CN); Runhua Chen, Beijing (CN); Wenhong Chen, Beijing (CN); Hui Li, Beijing (CN); Tamrakar Rakesh, Beijing (CN); Shaohui Sun, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/106,009

(22) Filed: Aug. 21, 2018

(65) Prior Publication Data

US 2018/0359015 A1   Dec. 13, 2018

Related U.S. Application Data

(63) Continuation of application No. 15/774,268, filed as application No. PCT/CN2016/103446 on Oct. 26, 2016.

(30) Foreign Application Priority Data

Nov. 6, 2015   (CN) .......................... 2015 1 0752977

(51) Int. Cl.
*H04B 7/06*   (2006.01)
*H04L 1/06*   (2006.01)
(Continued)

(52) U.S. Cl.
CPC ............. *H04B 7/0626* (2013.01); *H04B 7/04* (2013.01); *H04B 7/0417* (2013.01);
(Continued)

(58) Field of Classification Search
CPC ...... H04B 7/0626; H04B 7/04; H04B 7/0417; H04B 7/0456; H04B 7/0617; H04B 7/063; H04B 7/0632; H04B 7/0639; H04L 1/06
See application file for complete search history.

(56) References Cited

U.S. PATENT DOCUMENTS

2013/0070723 A1* 3/2013 Yie ...................... H04B 7/0639
370/329
2014/0029689 A1   1/2014 Liu et al.
(Continued)

FOREIGN PATENT DOCUMENTS

CN   102938687 A   2/2013
CN   104144007 A   11/2014
(Continued)

OTHER PUBLICATIONS

US 8,520,761 B2, 08/2013, Wang et al. (withdrawn)
(Continued)

*Primary Examiner* — Freshteh N Aghdam
(74) *Attorney, Agent, or Firm* — Kilpatrick Townsend & Stockton, LLP

(57) ABSTRACT

The disclosure discloses a method and apparatus for feeding back channel state information, and a method and apparatus for transmitting data. The method for feeding back channel state information includes: calculating channel state information according to a first codebook, where the first codebook is a set of elements and each of the elements is a set of pre-coding matrixes; and feeding back the channel state information.

10 Claims, 9 Drawing Sheets

(51) Int. Cl.
*H04B 7/04* (2017.01)
*H04B 7/0417* (2017.01)
*H04B 7/0456* (2017.01)

(52) U.S. Cl.
CPC .......... *H04B 7/0456* (2013.01); *H04B 7/063* (2013.01); *H04B 7/0617* (2013.01); *H04B 7/0632* (2013.01); *H04B 7/0639* (2013.01); *H04L 1/06* (2013.01)

(56) References Cited

U.S. PATENT DOCUMENTS

| | | | | |
|---|---|---|---|---|
| 2014/0105317 A1* | 4/2014 | Erell | ............... | H04B 7/0417 375/267 |
| 2014/0286452 A1* | 9/2014 | Gomadam | ........... | H04B 7/0417 375/267 |
| 2017/0201307 A1* | 7/2017 | Kim | ................ | H04B 7/04 |

FOREIGN PATENT DOCUMENTS

| | | |
|---|---|---|
| EP | 2557721 A1 | 2/2013 |
| JP | 2012506194 A | 3/2012 |
| JP | 2012532495 A | 12/2012 |
| WO | 2011008519 A1 | 1/2011 |
| WO | 2011124012 A1 | 10/2011 |
| WO | 2013145047 A1 | 10/2013 |
| WO | 2014180319 A1 | 11/2014 |

OTHER PUBLICATIONS

Chengling Jiang et al: "MIMO Pre-coding Using Rotating Codebooks", IEEE Transactions on Vehicular Technology, IEEE Service Center, Piscataway, NJ, US, on Mar. 3, 2011, pp. 1222-1227.

Huawei: Downlink 8TX codebook, 3GPP Draft; R1-101066 Downlink 8TX Codebook, 3rd Generation Partnership Project (3GPP), Mobile Competence Centre, 650, Route Des Lucioles; F-06921 Sophia-Antipolis Cedex; France; on Feb. 16, 2010, 11 pages.

Texas Instruments: "Possible Refinement on 8Tx Codebook Design", 3GPP Draft; R1-102104 TI 8TX MIMO, 3rd Generation Partnership Project (3GPP), Mobile Competence Centre ; 650, Route Des Lucioles ; F-06921 Sophia-Antipolis Cedex; on Apr. 6, 2010, 7 pages.

3GPP TSG RAN WG1 Meeting #81, R1-153388, 6.2.5.2.1, Samsung, "Reduced Feedback Scheme for Rel.13 FD-MIMO", Fukuoka, Japan, May 25-29, 2015.

Huawei, "Precoding restriction for open-loop spatial multiplexing", 3GPP TSG-RAN-WG1 Meeting #55, R1-084342, Prague, Czech Republic, Nov. 10-14, 2008.

Qualcomm Incorporated, "Remaining aspects of PRB bundling", 3GPP TSG-RAN WG1 #62bis, R1-105572, Xi'an, China, Oct. 11-15, 2010.

InterDigital, "Study of Open Loop MIMO using UE Specific RS", 3GPP TSG RAN WG1 Meeting #66, R1-112243, Athens, Greece, Aug. 22-26, 2011.

* cited by examiner

METHOD AND APPARATUS FOR FEEDING BACK CHANNEL STATE INFORMATION, AND A METHOD AND APPARATUS FOR TRANSMITTING DATA

This application is a continuation of U.S. patent application Ser. No. 15/774,268, filed May 7, 2018 and claims the benefit and priority of Chinese Patent Application No. CN201510752977.3, filed Nov. 6, 2015 and entitled "A method and apparatus for feeding back channel state information, and a method and apparatus for transmitting data". The content of each of the above applications is incorporated herein by reference.

FIELD

The present disclosure relates to the field of wireless communication, and particularly to a method and apparatus for feeding back channel state information (CSI), and a method and apparatus for transmitting data.

BACKGROUND

The closed-loop pre-coding technology has been introduced into the Long Term Evolution (LTE) Release 8 (Rel-8) system to improve the spectrum efficiency. Firstly the same set of pre-coding matrixes, referred to as a codebook, for closed-loop pre-coding is required to be stored in both a base station and a terminal. The terminal estimates channel information according to a cell common pilot, and then selects a pre-coding matrix from the codebook according to some criterion. The selection criterion can be maximizing mutual information, or maximizing output Signal to interference plus Noise Ratio (SINR), etc. The terminal feeds an index of the selected pre-coding matrix in the codebook back to the base station over an uplink channel, where the index is referred to as a Pre-coding Matrix Indicator (0). The base station can determine the pre-coding matrix to be used for the terminal, according to the received index. The pre-coding matrix reported by the terminal can be regarded as quantified CSI.

A transmission parameter is selected according to the feedback from the terminal in the closed-loop pre-coding technology. In a scenario where the terminal is moving at a high speed, the information fed back by the terminal may be outdated so that the transmission parameter mismatches a real channel condition, thus degrading the performance of the system. In order to cope with the scenario where the terminal is moving at a high speed, the open-loop Multiple Input Multiple Output (MIMO) transmission scheme has been introduced into the LTE Rel-8. In the open-loop MIMO transmission scheme, data is transmitted by using pre-coding matrixes in a predefined set alternately. The terminal only needs to feed back Channel Quality Indicator (CQI) information and Rank Indicator (RI) information without feeding back any PMI. The terminal calculates the CQI and the RI on the assumption that data is transmitted over resources by using the predefined pre-coding matrixes alternately.

As the antenna technology is advancing, active antennas whose array elements can be controlled separately become mature. FIG. 1 is a schematic structural diagram of dual polarized antennas arranged in the horizontal and vertical dimensions, and FIG. 2 is a schematic structural diagram of a linear antenna array arranged in the horizontal and vertical dimensions. As illustrated by FIGS. 1 and 2, antenna elements in an active antenna array can be arranged in a two dimensional plane to greatly reduce the size of the antenna array. A large-scale antenna array is generally embodied as two dimensional planar antenna arrays. Moreover, by using this kind of antenna array, a beam can be adjusted dynamically in the horizontal and vertical directions for more flexible beam-forming. Beam-forming in the horizontal and vertical directions using a two dimensional planar array is also referred to as Full-Dimension MIMO (FD-MIMO). FD-MIMO depends upon the CSI reported by the terminal, but the CSI reported by the terminal moving at a high speed may be unreliable.

As such, the predefined set of pre-coding matrixes is polled in the open-loop MIMO solution defined in the LTE Rel-8, and actually the space is traversed as a result of polling. However a drawback thereof lies in that a beam in the space tends to become narrower as the number of antennas increases, and thus to traverse the space, a large number of pre-coding matrixes need to be traversed, thereby significantly limiting implementation of the system, and failing to guarantee the performance thereof.

SUMMARY

Embodiments of the disclosure provide a method and apparatus for feeding back CSI, and a method and apparatus for transmitting data so as to avoid the entire space from being traversed while a pre-coding matrix is being determined by a base station and a terminal.

An embodiment of the disclosure provides a method for feeding back channel state information. The method includes: calculating channel state information according to a fourth codebook, where the fourth codebook is a set of elements and each of the elements is a set of pre-coding matrixes; and feeding back the channel state information.

An embodiment of the disclosure provides a method for transmitting data. The method includes: receiving returned channel state information; determining a set of pre-coding matrixes in a fourth codebook according to the channel state information; and transmitting data to a terminal, where the data to be transmitted is preprocessed by using the pre-coding matrixes in the set over resources allocated for the terminal before transmission of the data.

An embodiment of the disclosure provides an apparatus for feeding back channel state information. The apparatus includes: a transmitter, a processor and a memory storing at least one instruction. The processor is configured to execute the at least one instruction to: calculate channel state information according to a fourth codebook, where the fourth codebook is a set of elements and each of the elements is a set of pre-coding matrixes; and control the transmitter to teed back the channel state information.

BRIEF DESCRIPTION OF THE DRAWINGS

The drawings described herein are intended to facilitate understanding of the disclosure, and constitute a part, of the disclosure. The exemplary embodiments of the disclosure and the description thereof are intended to set forth the disclosure, but not intended to limit the disclosure unduly.

DETAILED DESCRIPTION OF THE EMBODIMENTS

Particular embodiments of the disclosure are described below with reference to the drawings.

In the technical solutions according to the embodiments of the disclosure, a pre-coding matrix needed for calculation in open-loop MIMO can be determined without traversing the entire space, thereby lowering the difficulty of designing and implementing the system, and improving the performance of the system, as described below. In the following description, implementations at the sides of the terminal and the base station are described respectively, and then an implementation with cooperation of the terminal and base station sides is described, but this does not mean that the implementation of both the sides must cooperate or must be carried out separately. In fact, problems existing respectively at the terminal side and the base station side are addressed in the separate implementations at the respective sides, although a better technical effect can be achieved in the implementation with cooperation of both the sides.

Figure 1:
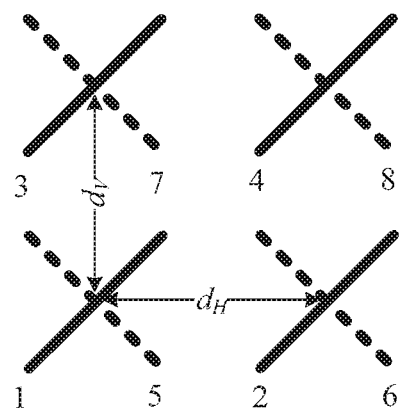
FIG. 1 is a schematic structural diagram of conventional dual polarized antennas arranged in the horizontal and vertical dimensions.
Figure 2:
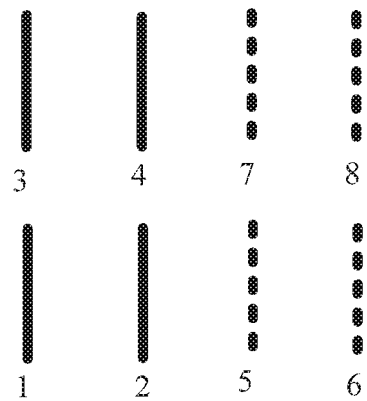
FIG. 2 is a schematic structural diagram of a conventional linear antenna array arranged in the horizontal and vertical dimensions.
Figure 3:
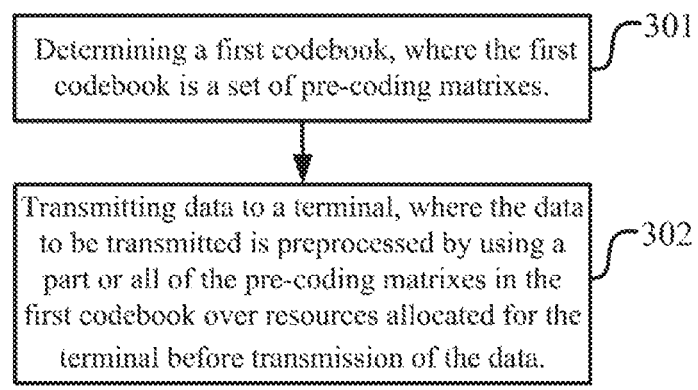
FIG. 3 is a schematic flow chart of a first method for transmitting data at the base station side according to an embodiment of the disclosure.

FIG. 3 is a schematic flow chart of a first method for transmitting data at the base station side, and as illustrated, the method can include the following operations.

The operation 301 is: determining a first codebook, where the first codebook is a set of pre-coding matrixes.

The operation 302 is: transmitting data to a terminal, where the data to be transmitted is preprocessed by using a part or all of the pre-coding matrixes in the first codebook over resources allocated for the terminal before transmission of the data.

In an implementation, preprocessing the data to be transmitted by using a part or all of the pre-coding matrixes in the first codebook over the resources allocated for the terminal before transmission of the data further includes: preprocessing the data to be transmitted by using a part or all of the pre-coding matrixes in the first codebook alternately over the resources allocated for the terminal.

Particularly, the pre-coding matrixes can be used alternately in such an implementation that given M1 resources and M2 pre-coding matrixes, the pre-coding matrixes are used alternately by using a first pre-coding matrix over a first resource, a second pre-coding matrix over a second resource, a third pre-coding matrix over a third resource, and so on. If M1>M2, then the first pre-coding matrix is used over an (M2+1)-th resource, the second pre-coding matrix is used over an (M2+2)-th resource, and so on.

A resource herein can be the minimum resource element defined in a corresponding communication system, e.g., a Resource Element (RE) in an LTE system, or can be a resource including a plurality of minimum resource elements, e.g., a resource including four REs in an LTE system, or a resource which is a physical resource block in an LTE system (a physical resource block includes 168 or 144 REs).

Figure 4:
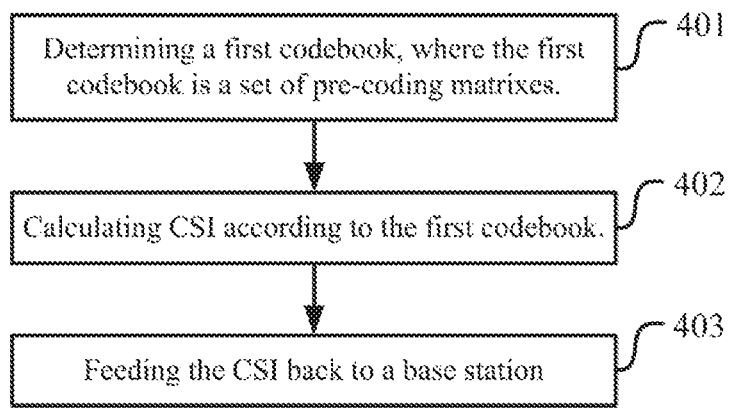
FIG. 4 is a schematic flow chart of a first method for feeding back CSI at the terminal side according to an embodiment of the disclosure.

FIG. 4 is a schematic flow chart of a first method for feeding back CSI at the terminal side. As illustrated, the method can include the following operations.

The operation 401 is: determining a first codebook, where the first codebook is a set of pre-coding matrixes.

The operation 402 is: calculating CSI according to the first codebook.

The operation 403 is: feeding the CSI back to a base station.

An embodiment with cooperation of the base station and the terminal is described below, and in this embodiment, the operations 401 to 403 are performed after the operation 301, and before the operation 302.

In an implementation, the first codebook includes R sub-sets $Z_n$, where $Z_n$ is a set consisting of n columns of pre-coding matrixes, and R is a natural number.

The first codebook can be determined at the base station side as follows.

1) The base station determines the first codebook according to uplink channel measurement, e.g., a measured direction of the terminal.

2) The base station determines the first codebook according to a feedback from the terminal. For example, the terminal feeds back a pre-coding matrix, and the base station determines pre-coding matrixes within a range of distances from the pre-coding matrix fed back by the terminal as the first codebook.

3) The base station determines the first codebook at its discretion.

At the terminal side, the first codebook is used for demodulation and calculation of CSI.

The first codebook is not necessary for demodulation because it is not necessary to determine the first codebook in some transmission modes. The first codebook required for calculating CSI can be informed by the base station to the terminal.

In an implementation, the subsets in the first codebook are independent of each other, or a mapping relationship exists between different subsets.

In an implementation, R can be the largest quantity of data stream layers that can be supported during transmission of the data between the base station and the terminal and is determined according to transmission capacities of the base station and the terminal. For example, if the base station has eight transmitting antennas, and the terminal has two receiving antennas, then the largest quantity of data streams that can be supported is 2, i.e., R=2.

Particularly, in an implementation of the operation 301, the base station determines a set of pre-coding matrixes as the first codebook. A subset consisting of matrixes having n columns (n ranks) in the first codebook is represented as $Z_n = \{W_{n,1}, W_{n,2}, \ldots, W_{n,Kn}\}$, where the subset $Z_n$ includes $K_n$ matrixes.

If the largest quantity of data stream layers that can be supported during transmission of the data between the base station and the terminal and is determined according to the transmission capacities of the base station and the terminal is R, then the largest quantity of columns in a pre-coding matrix is R. The implementation assumes that the first codebook includes pre-coding matrixes having 1, 2, ..., or R columns. However, the abovementioned methods still apply if the first codebook includes only a part of the pre-coding matrixes having 1, 2, ..., or R columns (for example, the first codebook includes only pre-coding matrixes having 2, 3, 4, ..., or R columns).

The relationship between the subsets can be as follows: the subsets $Z_1, Z_2, \ldots, Z_R$, are impendent of each other; or a mapping relationship exists between the subsets $Z_1, Z_2, \ldots, Z_R$. For example, all of the pre-coding matrixes in the subsets $Z_1, Z_2, \ldots, Z_R$ are determined functions of one of the matrixes in the subset $Z_1$, that is, given the subset $Z_1$, $Z_2, \ldots, Z_R$ can be determined according to $Z_1$ and the determined mapping relationship.

In an implementation, the determined first codebook can be further notified to the terminal after the operation 301 at the terminal side.

Correspondingly the first codebook can be determined according to received signaling in the operation 401.

In an implementation, when the determined first codebook is notified to the UE, if the respective subsets are independent of each other, then each pre-coding matrix in the first codebook is notified to the terminal; and if a mapping relationship exists between different subsets, then a part of the pre-coding matrixes in the first codebook is notified to the terminal.

In an implementation, the determined first codebook can be notified to the terminal via higher-layer signaling or physical-layer signaling.

Particularly the base station can notify the determined first codebook to the terminal via signaling which carries indication information of the first codebook. The signaling can be higher-layer signaling or physical-layer signaling. The base station can indicate each pre-coding matrix in the first codebook in the signaling, or the base station can indicate only a part of the pre-coding matrixes in the first codebook in the signaling, and the other pre-coding matrixes can be determined according to a specific mapping relationship. For example, the base station can indicate only the matrixes in the subset $Z_1$ in the signaling, and the matrixes in $Z_2, \ldots, Z_R$ can be determined according to $Z_1$, and the determined mapping relationship.

Correspondingly, at the terminal side, in a particular implementation, the terminal determines the first codebook according to the received indication information of the first codebook. If the indication information of the first codebook indicates each of the pre-coding matrixes in the first codebook, then the terminal may determine each of the pre-coding matrixes. If the indication information of the first codebook indicates a part of the pre-coding matrixes in the first codebook, then the terminal may determine all the pre-coding matrixes in the first codebook according to the part of the pre-coding matrixes and the mapping relationship.

Then the terminal calculates the CSI according to the determined first codebook. In an implementation, during the calculation, the terminal assumes that the data to be transmitted is preprocessed by using all or a part of the pre-coding matrixes in the first codebook alternately over the resources for transmitting the data.

Particularly the CSI calculated according to the first codebook can include a CQI and/or an RI. During the calculation, the terminal assumes that the data to be transmitted is preprocessed by using all or a part of the pre-coding matrixes in the first codebook alternately over the resources for transmitting the data.

In an implementation, during the calculation, the terminal assumes that the data to be transmitted is preprocessed by using all or a part of the pre-coding matrixes in the first codebook alternately over the resources for transmitting the data, can include: the terminal calculates the CSI according to the quantities of columns (subsets) in pre-coding matrixes in the first codebook, respectively, where when the terminal calculates the CSI according to a quantity n of columns, the terminal supposes that the data is to be transmitted over M resources, and the data is to be transmitted over these resources using all or a part of the pre-coding matrixes in $Z_n$ alternately, where M is a positive integer more than or equal to 1.

Particularly, the resources herein can be different frequency resources, e.g., Physical Resource Block (PRB) pairs, sub-carriers, etc., or different time resources, e.g., Orthogonal Frequency Division Multiplex (OFDM) symbols or sub-frames, or a combination of time and frequency resources.

If the terminal needs to determine a rank indicator, the terminal may determine the quantity of columns in each pre-coding matrix of a subset with the highest transmission capacity as a first RI after calculating CSI according to all the subsets in the first codebook. Particularly, the highest transmission capacity can be the highest CQI or the highest channel capacity, etc., or, the highest transmission capacity can correspond to the highest data transmission throughout or correspond to the largest data transport block size, etc.

Or, the terminal can determine the first RI according to an SINR, or based on singular value decomposition. Particularly, the terminal can calculate the RI independently, for example, according to an SINR, or based on singular value decomposition and determination of the RI according to a distribution condition of the singular values.

Thereafter the terminal feeds the CQI and/or the first RI back to the base station.

Then the base station transmits the data to the terminal. The data of the terminal is preprocessed by using a part or all of the pre-coding matrixes in the first codebook over the resources allocated for the terminal.

Particularly, when the base station transmits the data to the terminal, the data to be transmitted to the terminal is preprocessed by using a part or all of the pre-coding matrixes in the first codebook alternately over the resources allocated for the terminal.

Particularly, when the base station transmits the data to the terminal, the data to be transmitted to the terminal is preprocessed by using pre-coding matrixes in a sub-set $Z_r$ in the first codebook alternately over the resources allocated for the terminal, where r is the number of data stream layers transmitted from the base station to the terminal.

The base station can also transmit the data to the terminal by using pre-coding matrixes in a subset of the sub-set $Z_r$ alternately.

Figure 5:
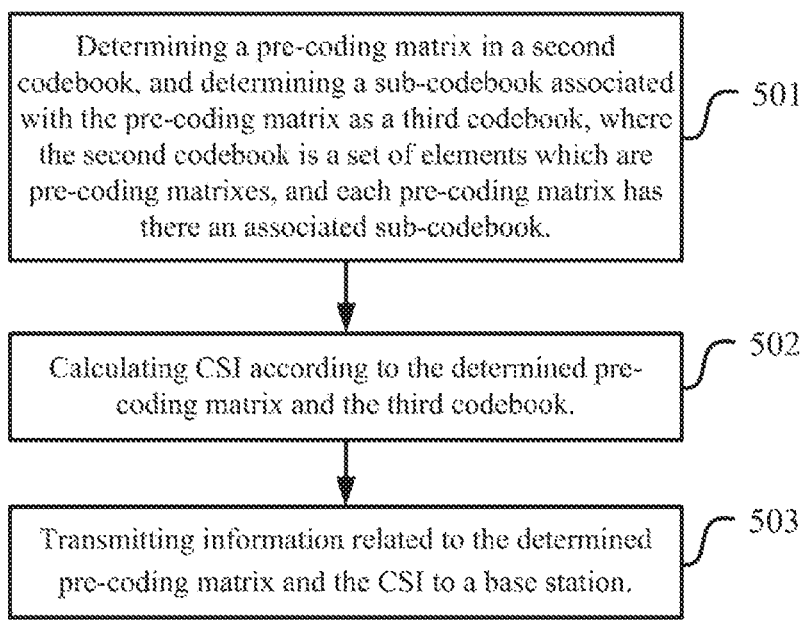
FIG. 5 is a schematic flow chart of a second method for feeding back CSI according to an embodiment of the disclosure.

FIG. 5 is a schematic flow chart of a second method for feeding back CSI, and as illustrated, the method can include the following operations.

The operation 501 is: determining a pre-coding matrix in a second codebook, and determining a sub-codebook associated with the pre-coding matrix as a third codebook, where the second codebook is a set of elements which are pre-coding matrixes, and each pre-coding matrix has there an associated sub-codebook.

The operation 502 is: calculating CSI according to the determined pre-coding matrix and the third codebook.

The operation 503 is: transmitting information related to the determined pre-coding matrix and the CSI to a base station.

Figure 6:
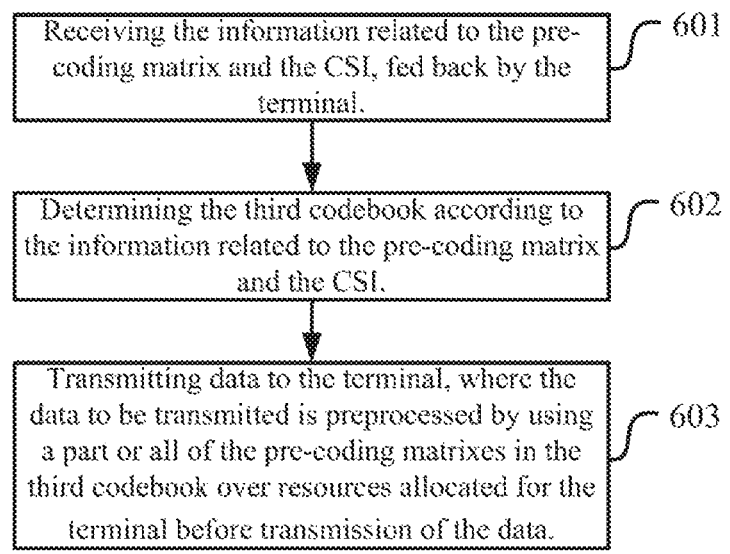
FIG. 6 is a schematic flow chart of a second method for transmitting data according to an embodiment of the disclosure.

FIG. 6 is a schematic flow chart of a second method for transmitting data, and as illustrated, the method can include the following operations.

The operation 601 is: receiving the information related to the pre-coding matrix and the CSI, fed back by the terminal.

The operation 602 is: determining the third codebook according to the information related to the pre-coding matrix and the CSI.

The operation 603 is: transmitting data to the terminal, where the data to be transmitted is preprocessed by using a part or all of the pre-coding matrixes in the third codebook over resources allocated for the terminal before transmission of the data.

In an implementation, the data to be transmitted can be preprocessed by using a part or all of the pre-coding matrixes in the third codebook alternately.

An embodiment with cooperation of the base station and the terminal is described below, and in this embodiment, the operations 601 to 603 are performed after the operation 503.

Each codeword (which is a pre-coding matrix) in the second codebook (which is a set of pre-coding matrixes) has an associated sub-codebook.

A. The quantity of columns in a sub-codebook associated with a codeword in the second codebook is the same as the quantity of columns in the codeword.

B. The quantity of columns in a sub-codebook associated with a codeword in the second codebook is different from the quantity of columns in the codeword. For example, the second codebook includes only codewords having one column, and each of sub-codebooks associated with codewords in the second codebook can include codewords having different quantities of columns.

The association can be stored respectively in the base station and the terminal after being calculated offline, or can be sent to the terminal via signaling after being determined by the base station; or can be transmitted to the base station after being determined by the terminal; or can be specified in a protocol, and stored respectively in the base station and the terminal as specified in the protocol.

An example of determining an associated sub-codebook is described below.

The distances between all candidate codewords and a codeword in the first codebook are calculated, the candidate codewords are sorted in an ascending order of their distances to the codeword in the first codebook, and the first N candidate codewords are determined as a sub-codebook associated with the codeword in the first codebook, where N is a predetermined size of the sub-codebook.

Or a distance threshold is preset, and candidate codewords whose distances from the codeword are below the threshold are determined as a sub-codebook associated with the codeword.

In an implementation, a pre-coding matrix in the second codebook can be determined as follows.

For each pre-coding matrix in the second codebook, calculating a corresponding performance index for the pre-coding matrix on the assumption that data to be transmitted is preprocessed by using the pre-coding matrix. And determining a pre-coding matrix according to the values of the performance indexes corresponding to the respective pre-coding matrixes.

Or, for each pre-coding matrix in the second codebook, calculating a performance index corresponding to a sub-codebook associated with the pre-coding matrix on the assumption that the data to be transmitted is preprocessed by using pre-coding matrixes in the sub-codebook. And determining a pre-coding matrix according to the values of the performance indexes corresponding to the sub-codebooks associated with the respective pre-coding matrixes.

In an implementation, when the data to be transmitted is supposed to be pre-processed by using the pre-coding matrixes in the sub-codebook, the data to be transmitted is supposed to be pre-processed by using the pre-coding matrixes in the sub-codebook alternately over the resources for transmitting the data, or the data to be transmitted is supposed to be pre-processed by using the pre-coding matrixes in the sub-codebook respectively over the resources for transmitting the data.

In an implementation, the performance index is one or a combination of the following indexes: an SINR, a channel capacity, a throughput, and an amount of mutual information.

A particular description thereof is given below.

The terminal determines a pre-coding matrix, called a first pre-coding matrix for example, where the first pre-coding matrix is an element in the first codebook, and can be determined by the terminal according to a condition of a channel from the base station to the terminal, etc.

Then the terminal determines a sub-codebook associated with the first pre-coding matrix as the third codebook. The third codebook is associated with the first pre-coding matrix so that the third codebook can be associated with the channel from the base station to the terminal instead of being selected randomly. The terminal can determine the first pre-coding matrix as follows.

1. For each pre-coding matrix in the second codebook, the terminal calculates performance indexes corresponding to the pre-coding matrix on the assumption that the base station pre-processes the data to be transmitted by using the pre-coding matrix. And the terminal determines the first pre-coding matrix according to the values of the performance indexes. A performance index can be an SINR, a channel capacity, a throughput, or an amount of mutual information.

2. For each pre-coding matrix in the second codebook, the terminal calculates a performance index of a sub-codebook associated with the pre-coding matrix in the sub-codebook on the assumption that the base station uses pre-coding matrixes in the sub-codebook to preprocess the data to be transmitted. And the terminal determines the first pre-coding matrix according to the values of the performance indexes. A performance index can be an SINR, a channel capacity, a throughput, or an amount of mutual information. When the terminal assumes that the data to be transmitted is preprocessed by using pre-coding matrixes in the sub-codebook, the terminal assumes that the data to be transmitted is preprocessed by using the pre-coding matrixes in the sub-codebook alternately over the resources for transmitting the data, or the terminal assumes that the data to be transmitted is preprocessed by using the pre-coding matrixes in the sub-codebook, respectively, over the resources for transmitting the data. Performance indexes of each pre-coding matrix in the sub-codebook are calculated, respectively, and the performance indexes of all (or a part) of the pre-coding matrixes in the sub-codebook are preprocessed as a whole (e.g., averaged) to obtain the performance index of the sub-codebook.

In an implementation, the method can further include the following operation: if the third codebook includes a plurality of pre-coding matrixes having different quantities of columns, then the terminal determines a second rank indicator. The second rank indicator is determined according to a channel of from base station to the terminal. Or, the terminal calculates transmission capacities according to each possible quantity of columns in the third codebook, assuming the data to be transmitted is preprocessed by using each of the pre-coding matrixes having the different numbers of columns, respectively, and selects the quantity of columns with the highest transmission capacity as the second rank indicator.

Particularly, the channel state information determined by the terminal according to the determined third codebook includes a second CQI and a second RI.

For each codeword in the second codebook, if the number of columns of an associated sub-codebook of the codewords is the same as the number of columns in the codeword, then the number of columns in each pre-coding matrix in the third codebook is the same as the number of columns in the first pre-coding matrix, and the terminal does not need to calculate the second RI. When calculating the transmission capacities, the terminal assumes that the data is to be transmitted over M resources, and the data to be transmitted over these resources is pre-processed by using the matrixes in the third codebook alternately, where M is a positive integer more than or equal to 1.

If the third codebook includes a plurality of codewords having different numbers of columns, then the terminal needs to determine the second RI.

In an implementation, the second RI can be determined by calculating the second RI according to the channel from the base station to the terminal. For example, a channel matrix can be decomposed into singular values, and the second RI can be determined according to a distribution of the singular values. Or the second RI can be determined also according to an SINR of a receiver.

In another implementation, the second RI can be determined as follows: for each possible quantity of columns of the pre-coding matrixes in the third codebook, the terminal calculates a transmission capacity according to the quantity of columns in the third codebook, assuming the data to be transmitted is preprocessed by using a pre-coding matrix having the quantity of columns, and selects the quantity of columns with the highest transmission capacity as the value of the second RI. When the terminal calculates the transmission capacities of pre-coding matrixes each having r columns, it assumes that the data is to be transmitted over M resources, and that the data to be transmitted over these resources is preprocessed by using the pre-coding matrixes having r columns alternately, where M is a positive integer more than or equal to 1, and Kr is the number of pre-coding matrixes having r columns in the second codebook. A transmission capacity can be a CQI, an SINR, or a throughput, etc.

A corresponding second CQI needs to be determined after the second RI is determined. When calculating the CSI, the terminal assumes that the data is to be transmitted over M resources, and the data to be transmitted over these resources is pre-processed by using matrixes having the same quantity of columns as the second RI in the second codebook alternately, where M is a positive integer more than or equal tot. The second CQI can be used for the base station perform link adaptation.

Correspondingly, when the terminal feeds back information about the first pre-coding matrix, if all the codewords in the second codebook have the same quantity of columns, then the terminal may feedback only an index of the first pre-coding matrix in the second codebook. If the codewords in the second codebook include a plurality of codewords having different quantities of columns, then the terminal may feed back the quantity of columns (the second RI) and an index of the first pre-coding matrix in the second codebook.

The terminal feeds back the second CQI and the second RI, but if the information about the first pre-coding matrix includes information about the quantities of columns, then the second RI may be omitted.

At the base station side, in an implementation, the third codebook can be determined according to the information related to the pre-coding matrix and the channel state information, includes: determining a sub-codebook associated with the pre-coding matrix as the third codebook.

In an implementation, if the third codebook includes a plurality of pre-coding matrixes having different quantities of columns, then the method may further include the following operations: the base station receives the second rank indicator fed back by the terminal; and after the pre-coding matrix is determined in the second codebook according to the information related to the pre-coding matrix, the base station determines pre-coding matrixes, with their quantities of columns being equal to the second rank indicator, in the sub-codebook associated with the pre-coding matrix as the third codebook.

Particularly the base station determines the third codebook according to the information about the first pre-coding matrix and the second RI, fed back by the terminal.

The base station firstly determines the first pre-coding matrix according to the information about the first pre-coding matrix, and determines the sub-codebook associated with the first pre-coding matrix.

If the sub-codebook associated with the first pre-coding matrix includes matrixes having the same quantity of columns, then the sub-codebook or a part of elements in the sub-codebook are determined as the third codebook.

If the sub-codebook associated with the first pre-coding matrix includes matrixes having different quantities of columns, then all or a part of codewords, with their quantities of columns being equal to the second RI, in the sub-codebook are determined as the third codebook.

Lastly the base station transmits the data to the terminal. The data to be transmitted is preprocessed by using a part or all of the pre-coding matrixes in the third codebook over the resources allocated for the terminal.

Furthermore the data to be transmitted is preprocessed by using a part or all of the pre-coding matrixes in the third codebook alternately over the resources allocated for the terminal.

Figure 7:
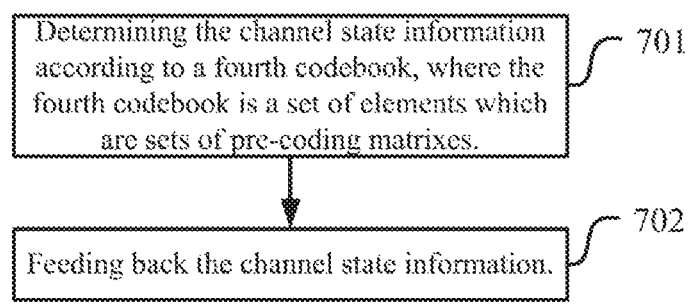
FIG. 7 is a schematic flow chart of a third method for feeding back CSI according to an embodiment of the disclosure.

FIG. 7 is a schematic flow chart of an implementation of a third method for feeding back channel state information, and as illustrated, the method can include the following operations.

The operation 701 is: determining the channel state information according to a fourth codebook, where the fourth codebook is a set of elements which are sets of pre-coding matrixes.

The operation 702 is: feeding back the channel state information.

Figure 8:
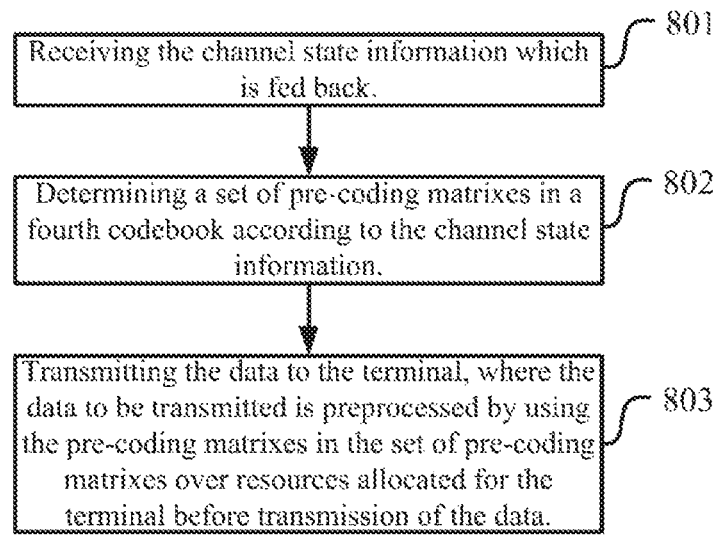
FIG. 8 is a schematic flow chart of an implementation of a third method for transmitting data according to an embodiment of the disclosure.

FIG. 8 is a schematic flow chart of an implementation of a third method for transmitting data, and as illustrated, the method can include the following operations.

The operation 801 is: receiving the channel state information which is fed back.

The operation 802 is: determining a set of pre-coding matrixes in a fourth codebook according to the channel state information.

The operation 803 is: transmitting the data to the terminal, where the data to be transmitted is preprocessed by using the pre-coding matrixes in the set of pre-coding matrixes over resources allocated for the terminal before transmission of the data.

In an implementation, the data to be transmitted can be preprocessed by using the pre-coding matrixes in the set of pre-coding matrixes alternately.

An embodiment with cooperation of the base station and the terminal is described below, and in this embodiment, the operations 801 to 803 are performed after the operation 702.

In an implementation, firstly the fourth codebook is determined. The fourth codebook is a set of elements which are sets of pre-coding matrixes. The fourth codebook can be determined in advance by the base station and the terminal, and stored respectively in the base station and the terminal; or can be sent to the terminal by the base station via signaling after being determined by the base station or sent to the base station by the terminal via signaling after being determined by the terminal; or can be specified in a protocol, and stored respectively in the base station and the terminal.

In an implementation, the channel state information can be calculated according to the fourth codebook on the assumption that the data to be transmitted is preprocessed by using the sets of pre-coding matrixes in the fourth codebook over the resources for transmitting the data.

In an implementation, the channel state information can be calculated according to the fourth codebook on the assumption that the data to be transmitted is preprocessed by using the pre-coding matrixes in the sets of pre-coding matrixes alternately over the resources for transmitting the data.

In an implementation, the channel state information is a CQI, and a set of pre-coding matrixes corresponding to the CQI is one of the sets of pre-coding matrixes in the fourth codebook, and the data to be transmitted is assumed to be preprocessed by using all or a part of the pre-coding matrixes in the set of pre-coding matrixes over the resources for transmitting the data.

Or, the channel state information is indication information of a set of pre-coding matrixes, the indication information of the set of pre-coding matrixes is an index, of one of the sets of pre-coding matrixes in the fourth codebook, in the fourth codebook, and the set of pre-coding matrixes is a recommended set of pre-coding matrixes in the fourth codebook.

Particularly the terminal determines the channel state information according to the fourth codebook. The channel state information includes a CQI and indication information of a set of pre-coding matrixes, and the indication information of the set of pre-coding matrixes corresponds to one of the sets of pre-coding matrixes in the fourth codebook.

For a set of pre-coding matrixes in the fourth codebook, the terminal calculates CQI(s) corresponding thereto. During calculation, the terminal assumes that the data to be transmitted is preprocessed by using all or a part of the pre-coding matrixes in the set of pre-coding matrixes alternately over the resources for transmitting the data.

The terminal determines a set of pre-coding matrixes, and determines an index of the set in the fourth codebook as indication information of a set of pre-coding matrixes. The terminal can select a recommended set of pre-coding matrixes in the fourth codebook.

In an implementation, the method can further include the following operations: if different sets of pre-coding matrixes in the fourth codebook include pre-coding matrixes having different quantities of columns, then: a third rank indicator is determined, where the third rank indicator and the indication information of the set of pre-coding matrixes jointly correspond to one of the sets of pre-coding matrixes in the fourth codebook; or one of the sets of pre-coding matrixes in the fourth codebook is indicated by using the indication information of the set of pre-coding matrixes.

Correspondingly in an implementation, when the channel state information is fed back to the base station, the third rank indicator is fed back to the base station.

Particularly, if the pre-coding matrixes in the different sets of pre-coding matrixes in the fourth codebook have different quantities of columns (ranks), then: the terminal determines a third rank indicator, where the third rank indicator and the indication information of the set of pre-coding matrixes jointly correspond to one of the sets of pre-coding matrixes in the fourth codebook or the terminal only uses the indication information of the set of pre-coding matrixes to indicate one of the sets of pre-coding matrixes in the fourth codebook.

Then the terminal feeds the CQI and the indication information of the set of pre-coding matrixes back to the base station, or when the pre-coding matrixes have different quantities of columns (ranks), the terminal feeds back the third rank indicator and the indication information of the set of pre-coding matrixes.

The base station receives the feedback information from the terminal, and determines the first set of pre-coding matrixes according to the indication information of the set of pre-coding matrixes (or the rank indicator and the indication information of the set of pre-coding matrixes).

The base station transmits the data to the terminal. The data to be transmitted is preprocessed by using the pre-coding matrixes in the first set of pre-coding matrixes alternately over the resources allocated for the terminal.

In an implementation, the fourth codebook can be constructed from a set of matrixes. For example, if a set of matrixes have sixteen matrixes, which are represented respectively as $W_0, W_1, \ldots, W_{15}$, then the fourth codebook may be constructed according to the following table. There are sixteenth sets of pre-coding matrixes in the following fourth codebook, and there are four pre-coding matrixes in each set of matrixes, so as depicted in the following table.

| An index in the fourth codebook | A set of pre-coding matrixes |
| --- | --- |
| 0 | $\{W_0, W_1, W_2, W_3\}$ |
| 1 | $\{W_2, W_3, W_4, W_5\}$ |
| 2 | $\{W_4, W_5, W_6, W_7\}$ |
| 3 | $\{W_6, W_7, W_8, W_9\}$ |
| 4 | $\{W_8, W_9, W_{10}, W_{11}\}$ |
| 5 | $\{W_{10}, W_{11}, W_{12}, W_{13}\}$ |
| 6 | $\{W_{12}, W_{13}, W_{14}, W_{15}\}$ |
| 7 | $\{W_{14}, W_{15}, W_0, W_1\}$ |
| 8 | $\{W_0, W_4, W_8, W_{12}\}$ |
| 9 | $\{W_1, W_5, W_9, W_{13}\}$ |
| 10 | $\{W_2, W_6, W_{10}, W_{14}\}$ |
| 11 | $\{W_3, W_7, W_{11}, W_{15}\}$ |
| 12 | $\{W_0, W_2, W_4, W_6\}$ |
| 13 | $\{W_1, W_3, W_5, W_7\}$ |
| 14 | $\{W_8, W_{10}, W_{12}, W_{14}\}$ |
| 15 | $\{W_9, W_{11}, W_{13}, W_{15}\}$ |

Based upon the same inventive idea, embodiments of the disclosure further provide an apparatus for feeding back channel state information, and an apparatus for transmitting data, and since these apparatuses address the problem under a similar principle to the method for feeding back channel state information, and the method for transmitting data, reference can be made to the implementations of the methods for implementations of these apparatuses, and a repeated description thereof is omitted herein.

Figure 9:
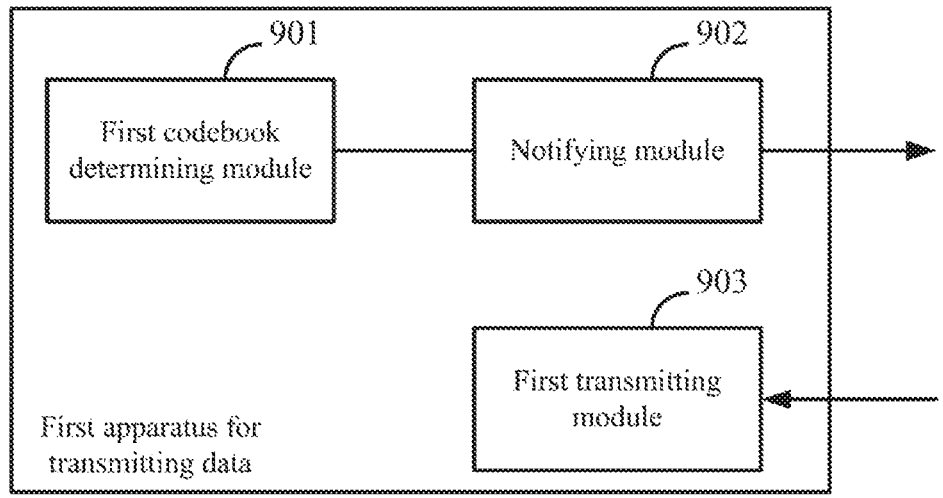
FIG. 9 is a schematic structural diagram of a first apparatus for transmitting data according to an embodiment of the disclosure.

FIG. 9 is a schematic structural diagram of a first apparatus for transmitting data. As illustrated, the apparatus can include a first codebook determining module 901 and a first transmitting module 903. The first codebook determining module 901 is configured to determine a first codebook, and the first codebook is a set of pre-coding matrixes. The first transmitting module 903 is configured to transmit data to a terminal and preprocess the data to be transmitted by using a part or all of the pre-coding matrixes in the first codebook over resources allocated for the terminal before transmission of the data.

In an implementation, the first transmitting module is further configured to preprocess the data to be transmitted by using the part or all of the pre-coding matrixes in the first codebook alternately over the resources allocated for the terminal.

In an implementation, the first codebook comprises R sub-sets Zn. Zn is a set of pre-coding matrixes each having n columns, and R is a natural number.

In an implementation, R is a largest quantity of data stream layers that can be supported during transmission of the data and is determined according to transmission capacities of the base station and the terminal.

In an implementation, the subsets in the first codebook are independent of each other, or a mapping relationship exists between different subsets in the first codebook.

In an implementation, the apparatus further includes a notifying module 902 configured to notify the terminal of the determined first codebook.

In an implementation, when the notifying module notifies the terminal of the determined first codebook, the notifying module is further configured to: notify the terminal of each of the pre-coding matrixes in the first codebook when the subsets of the first codebook are independent of each other; or notify the terminal of the part of the pre-coding matrixes in the first codebook when a mapping relationship exists between different subsets of the first codebook.

In an implementation, the notifying module is further configured to notify the terminal of the determined first codebook via higher-layer signaling or physical-layer signaling.

In an implementation, the part or all of the pre-coding matrixes are determined according to channel state information fed back by the terminal.

Figure 10:
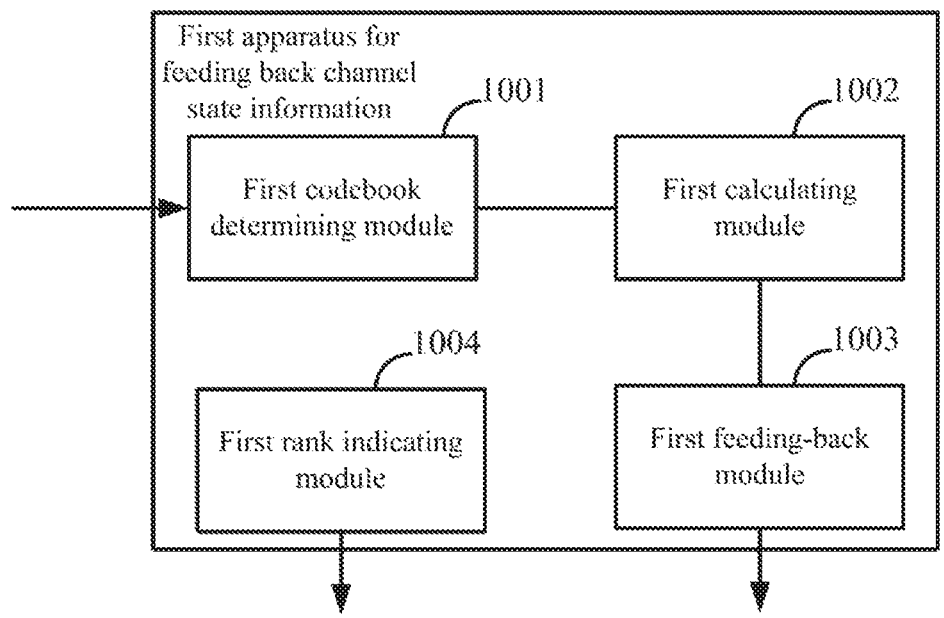
FIG. 10 is a schematic structural diagram of a first apparatus for feeding back CSI according to an embodiment of the disclosure.

FIG. 10 is a schematic structural diagram of a first apparatus for feeding back channel state information, and as illustrated, the apparatus can include: a first codebook determining module 1001, a first calculating module 1002 and a first feeding-back module 1003. The first codebook determining module 1001 is configured to determine a first codebook, and the first codebook is a set of pre-coding matrixes. The first calculating module 1002 is configured to calculate channel state information according to the first codebook. The first feeding-back module 1003 is configured to feed the channel state information back to a base station.

In an implementation, subsets included in the first codebook are independent of each other, or a mapping relationship exists between different subsets included in the first codebook.

In an implementation, the first codebook determining module is further configured to determine the first codebook according to received signaling.

In an implementation, when determining the first codebook according to the received signaling, the first codebook determining module is further configured to: determine each pre-coding matrix in the first codebook according to the received signaling when the subsets are independent of each other; or determine each pre-coding matrix in the first codebook according to a part of the pre-coding matrixes indicated in the received signaling when a mapping relationship exists between different subsets.

In an implementation, the first codebook determining module is further configured to determine the first codebook according to higher-layer signaling or physical-layer signaling.

In an implementation, when calculating the channel state information according to the first codebook, the first calculating module is further configured to calculate the channel state information on an assumption that data to be transmitted is preprocessed by using all or a part of the pre-coding matrixes in the first codebook over resources for transmitting the data.

In an implementation, the first calculating module is further configured to calculate the channel state information on the assumption that the data to be transmitted is preprocessed by using all or the part of the pre-coding matrixes in the first codebook alternately over the resources for transmitting the data.

In an implementation, the first codebook includes R sub-sets Zn. Zn is a set of pre-coding matrixes each having n columns, and R is a natural number. When calculating the channel state information on the assumption that the data to be transmitted is preprocessed by using all or the part of the pre-coding matrixes in the first codebook alternately over the resources for transmitting the data, the first calculating module is further configured to: calculate the channel state information according to quantities of columns of all or the part of the pre-coding matrixes in the first codebook, respectively; where when calculating the channel state information according to a quantity n of columns, assume that the data is to be transmitted over M resources, and that the data is preprocessed by using all or a part of the pre-coding matrixes in Zn alternately over the M resources. M is a positive integer more than or equal to 1.

In an implementation, R is a largest quantity of data stream layers that can be supported during transmission of the data and is determined according to transmission capacities of the base station and the terminal.

In an implementation, the apparatus further includes a first rank indicating module 1004. The first rank indicating module 1004 is configured to: calculate the channel state information according to all subsets in the first codebook, and determine a quantity of columns of each pre-coding matrix in a subset with a highest transmission capacity as a first rank indicator; or determine the first rank indicator according to an SINR or based on singular value decomposition.

Figure 11:
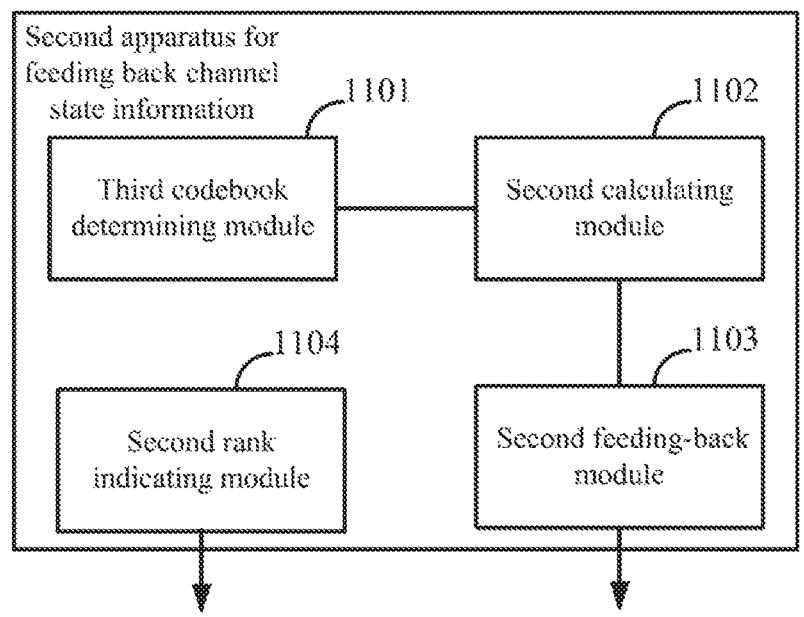
FIG. 11 is a schematic structural diagram of a second apparatus for feeding back CSI according to an embodiment of the disclosure.

FIG. 11 is a schematic structural diagram of a second apparatus for feeding back channel state information. As illustrated, the apparatus can include: a third codebook determining module 1101, a second calculating module 1102 and a second feeding-back module 1103. The third codebook determining module 1101 is configured to: determine a pre-coding matrix in a second codebook, and determine a sub-codebook associated with the pre-coding matrix as a third codebook. The second codebook is a set of elements, the elements are pre-coding matrixes, and each of the pre-coding matrixes has an associated sub-codebook. The second calculating module 1102 is configured to calculate channel state information according to the determined pre-coding matrix and the third codebook. The second feeding-back module 1103 is configured to transmit information about the determined pre-coding matrix and the channel state information to a base station.

In an implementation, when determining the pre-coding matrix in the second codebook, the third codebook determining module is further configured to: for each pre-coding matrix in the second codebook, calculate a corresponding performance index on an assumption that data to be transmitted is preprocessed by using the pre-coding matrix, and determine a pre-coding matrix according to values of the performance indexes corresponding to each of the pre-coding matrixes in the second codebook; or for each pre-coding matrix in the second codebook: calculate a performance index corresponding to a sub-codebook associated with the pre-coding matrix on an assumption that the data to be transmitted is preprocessed by using pre-coding matrixes in the sub-codebook, and determine a pre-coding matrix according to values of the performance indexes corresponding to the sub-codebooks associated with each of the pre-coding matrixes.

In an implementation, when assuming that the data to be transmitted is preprocessed by using pre-coding matrixes in a sub-codebook, the third codebook determining module is further configured to: assume that the data to be transmitted is preprocessed by using the pre-coding matrixes in the sub-codebook alternately over resources for transmitting the data, or assume that the data to be transmitted is preprocessed by using the pre-coding matrixes in the sub-codebook over the resources for transmitting the data, respectively.

In an implementation, the apparatus further includes a second rank indicating module 1104 configured to determine a second rank indicator when the third codebook comprises a plurality of pre-coding matrixes having different quantities of columns. The second rank indicator is determined according to a channel from the base station to the terminal. Or the second rank indicator is determined by: for each possible quantity of columns of the pre-coding matrixes in the third codebook, calculating a transmission capacity according to the quantity of columns in the third codebook on an assumption that data to be transmitted is preprocessed by using a pre-coding matrix having the quantity of columns in the third codebook; and selecting a quantity of columns with a highest transmission capacity as the second rank indicator.

The second feeding-back module is further configured to return the second rank indicator to the base station when feeding the channel state information back to the base station.

Figure 12:
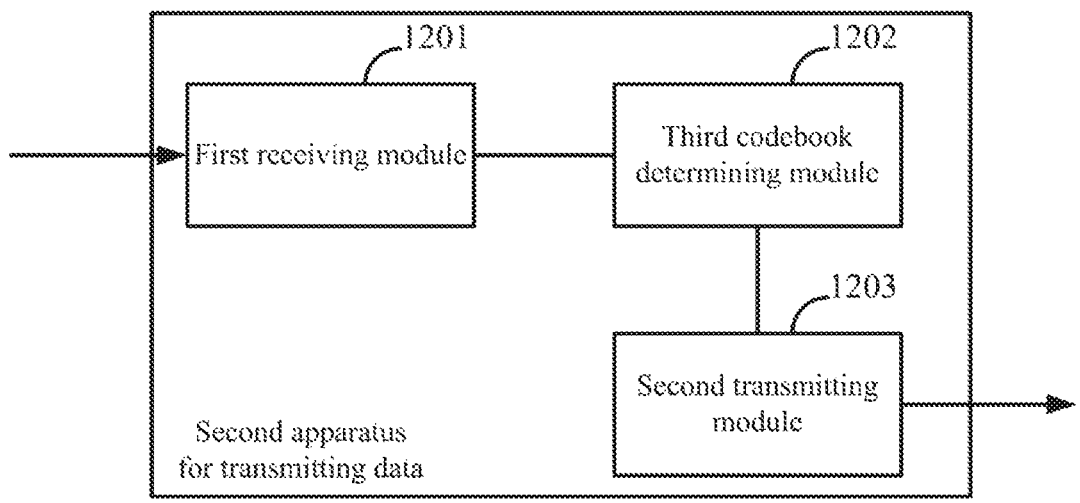
FIG. 12 is a schematic structural diagram of a second apparatus for transmitting data according to an embodiment of the disclosure.

FIG. 12 is a schematic structural diagram of a second apparatus for transmitting data. As illustrated, the apparatus can include a first receiving module 1201, a third codebook determining module 1202 and a second transmitting module 1203. The first receiving module 1201 is configured to receive information related to a pre-coding matrix and channel state information fed back by a terminal. The third codebook determining module 1202 is configured to determine a third codebook according to the information related to the pre-coding matrix and the channel state information. The second transmitting module 1203 is configured to transmit data to the terminal and preprocess the data to be transmitted by using a part or all of the pre-coding matrixes in the third codebook over resources allocated for the terminal before transmission of the data.

In an implementation, the second transmitting module is further configured to preprocess the data to be transmitted by using the part or all of the pre-coding matrixes in the third codebook alternately.

In an implementation, when the third codebook includes a plurality of pre-coding matrixes having different quantities of columns, the first receiving module is further configured to receive a second rank indicator fed back by the terminal. The third codebook determining module is further configured to determine pre-coding matrixes, each having a quantity of columns equal to the second rank indicator, in a sub-codebook associated with the pre-coding matrix as the third codebook after the pre-coding matrix is determined in the second codebook according to the information related to the pre-coding matrix.

Figure 13:
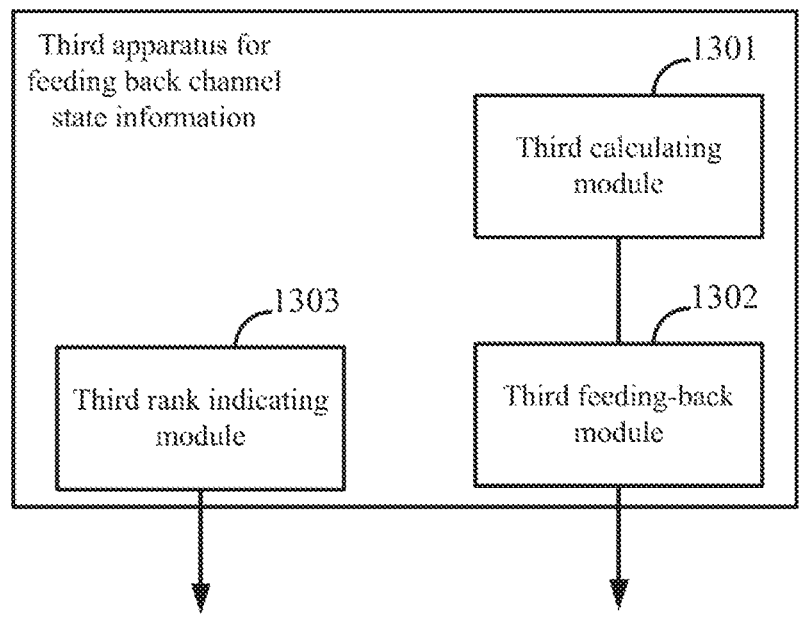
FIG. 13 is a schematic structural diagram of a third apparatus for feeding back CSI according to an embodiment of the disclosure.

FIG. 13 is a schematic structure diagram of a third apparatus for feeding back channel state information. As illustrated, the apparatus can include a third calculating module 1301 and a third feeding-back module 1302. The third calculating module 1301 is configured to calculate channel state information according to a fourth codebook, where the fourth codebook is a set of elements and each of the elements is a set of pre-coding matrixes. The third feeding-back module 1302 is configured to feed back the channel state information.

In an implementation, when calculating the channel state information according to the fourth codebook, the third calculating module is further configured to calculate the channel state information on an assumption that data is preprocessed by using a set of pre-coding matrixes in the fourth codebook over resources for transmitting the data.

In an implementation, the third calculating module is further configured to calculate the channel state information on an assumption that the data is preprocessed by using pre-coding matrixes in the set of pre-coding matrixes alternately over the resources for transmitting the data.

In an implementation, the channel state information is a CQI, a set of pre-coding matrixes corresponding to the CQI is one of the sets of pre-coding matrixes in the fourth codebook, and the third calculating module is further configured to calculate the channel state information on an assumption that data is preprocessed by using all or a part of the pre-coding matrixes in the set of pre-coding matrixes over resources for transmitting the data. Or, the channel state information is indication information of a set of pre-coding matrixes, the indication information of the set of pre-coding matrixes is an index of one of the sets of pre-coding matrixes in the fourth codebook and the set of pre-coding matrixes is a recommended set of pre-coding matrixes in the fourth codebook.

In an implementation, the apparatus can further include a third rank indicating module 1303. The third rank indicating module 1303 is configured to determine a third rank indicator when pre-coding matrixes in different sets of pre-coding matrixes in the fourth codebook have different quantities of columns. The third rank indicator and indication information of a set of pre-coding matrixes jointly correspond to one of the sets of pre-coding matrixes in the fourth codebook. Or the third rank indicating module 1303 is configured to indicate one of the sets of pre-coding matrixes in the fourth codebook by using the indication information of the set of pre-coding matrixes.

In an implementation, the third feeding-back module is further configured to feed the third rank indicator back to the base station when feeding the channel state information back to the base station.

Figure 14:
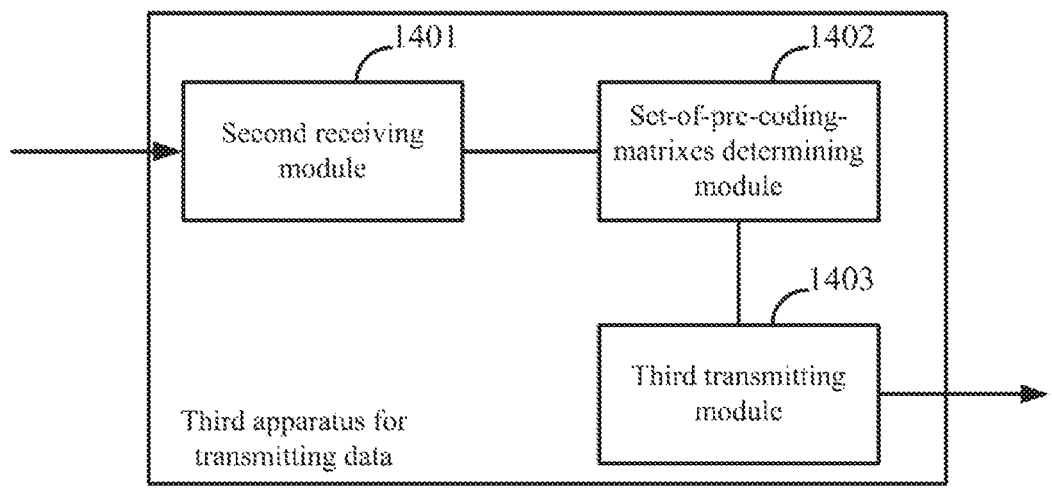
FIG. 14 is a schematic structural diagram of a third apparatus for transmitting data according to an embodiment of the disclosure.

FIG. 14 is a schematic structural diagram of a third apparatus for transmitting data. As illustrated, the apparatus can include a second receiving module 1401, a set-of-pre-coding-matrixes determining module 1402 and a third transmitting module 1403. The second receiving module 1401 is configured to receive returned channel state information. The set-of-pre-coding-matrixes determining module 1402 configured to determine a set of pre-coding matrixes in a fourth codebook according to the channel state information. The third transmitting module 1403 is configured to determine a set of pre-coding matrixes in a fourth codebook according to the channel state information.

In an implementation, when preprocessing the data by using the pre-coding matrixes in the set of pre-coding matrixes, the third transmitting module is further configured to preprocess the data by using the pre-coding matrixes in the set of pre-coding matrixes alternately.

In an implementation, the channel state information is a CQI, and a set of pre-coding matrixes corresponding to the CQI is a set of pre-coding matrixes in the fourth codebook, the third transmitting module is further configured to preprocess the data by using all or a part of the pre-coding matrixes in the set of pre-coding matrixes alternately over the resources for transmitting the data.

Or the channel state information is indication information of a set of pre-coding matrixes, the indication information of the set of pre-coding matrixes is an index of a set of pre-coding matrixes in the fourth codebook, and the set of pre-coding matrixes is a set of pre-coding matrixes having a highest CQI in the fourth codebook, or a set of pre-coding matrixes having a CQI mapped to a highest throughout in the fourth codebook.

In an implementation, when pre-coding matrixes of different sets of pre-coding matrixes in the fourth codebook have different quantities of columns, the second receiving module is further configured to receive a third rank indicator. The third rank indicator and indication information of a set of pre-coding matrixes jointly correspond to one of the sets of pre-coding matrixes in the fourth codebook.

Or, when pre-coding matrixes of different sets of pre-coding matrixes in the fourth codebook have different quantities of columns, the set-of-pre-coding-matrixes determining module is further configured to determine one of the sets of pre-coding matrixes in the fourth codebook according to the indication information of the set of pre-coding matrixes.

For the sake of a convenient description, different parts of the apparatuses are described above as various modules or units according to their functions. Of course, the functions of the modules or units can be performed by one or multiple pieces of software or hardware in an embodiment of the disclosure.

The technical solutions according to the embodiments of the disclosure can be implemented as follows.

Figure 15:
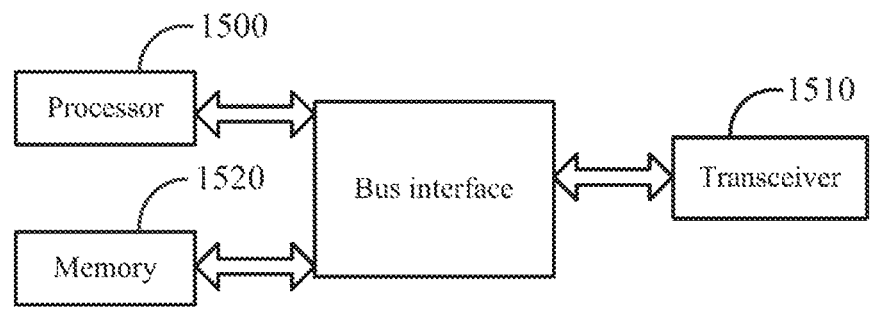
FIG. 15 is a schematic structural diagram of a first base station according to an embodiment of the disclosure.

FIG. 15 is a schematic structural diagram of a first base station. As illustrated, the base station can include a processor 1500, a transceiver 1510 and a memory 1520.

The processor 1500 is configured to read a program in the memory 1520 to: determine a first codebook, where the first codebook is a set of pre-coding matrixes; and preprocess data to be transmitted by using a part or all of the pre-coding matrixes in the first codebook over resources allocated for the terminal before transmission of the data.

The transceiver 1510 is configured to transmit the data to the terminal under the control of the processor 1500.

In an implementation, preprocessing the data to be transmitted by using the part or all of the pre-coding matrixes in the first codebook over the resources allocated for the terminal further includes: preprocessing the data to be transmitted by using the part or all of the pre-coding matrixes in the first codebook alternately over the resources allocated for the terminal.

In an implementation, the first codebook comprises R sub-sets Zn. $Z_n$ is a set of pre-coding matrixes each having n columns. R is a natural number.

In an implementation, R is a largest quantity of data stream layers that can be supported during transmission of the data and is determined according to transmission capacities of the base station and the terminal.

In an implementation, the subsets in the first codebook are independent of each other. Or a mapping relationship exists between different subsets in the first codebook.

In an implementation, the processor is further configured to notify the terminal of the determined first codebook.

In an implementation, when notifying the terminal of the determined first codebook, the processor is configured to: notify the terminal of each of the pre-coding matrixes in the first codebook when the subsets of the first codebook are independent of each other; or notify the terminal of a part of the pre-coding matrixes in the first codebook when a mapping relationship exists between different subsets of the first codebook.

In an implementation, the terminal is notified of the determined first codebook via higher-layer signaling or physical-layer signaling.

In an implementation, the part or all of the pre-coding matrixes are determined according to channel state information fed back by the terminal.

In FIG. 15, the bus architecture can include any quantities of interconnecting buses and bridges to link together various circuits including one or more processors represented by the processor 1500, and one or more memories represented by the memory 1520. The bus architecture can further link together various other circuits, e.g., peripherals, manostats, power management circuits, etc., all of which are well known in the art, so a further description thereof is omitted herein. The bus interface serves as an interface. The transceiver 1510 can be a number of elements including a transmitter and a receiver, which are units for communication with various other devices over a transmission medium. The processor 1500 is responsible for managing the bus architecture and performing normal processes, and the memory 1520 can store data for use by the processor 1500 in performing the operations.

Figure 16:
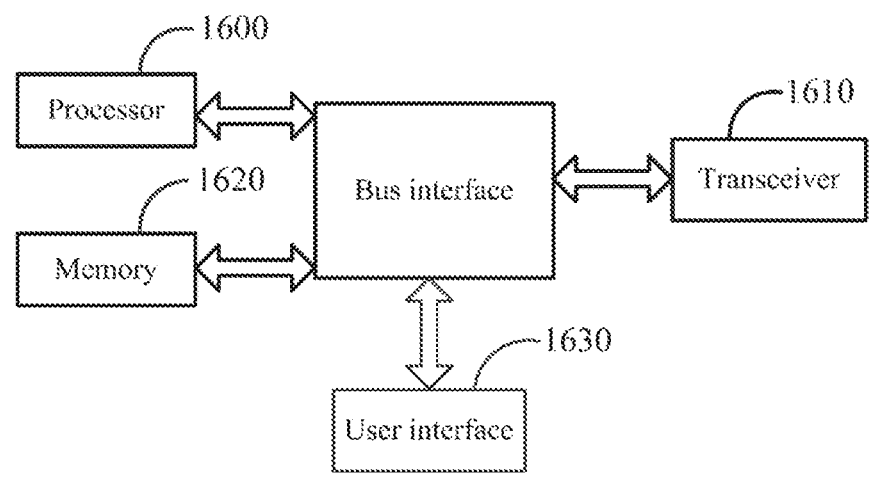
FIG. 16 is a schematic structural diagram of a first terminal according to an embodiment of the disclosure.

FIG. 16 is a schematic structural diagram of a first terminal. As illustrated, the terminal can include a processor 1600, a transceiver 1610 and a memory 1620.

The processor 1600 is configured to read a program in the memory 1620 to perform: determining a first codebook, where the first codebook is a set of pre-coding matrixes; and calculating channel state information according to the first codebook.

The transceiver 1610 is configured to be controlled by the processor 1600 to feed the channel state information back to a base station.

In an implementation, subsets included by the first codebook are independent of each other, or a mapping relationship exists between different subsets comprised by the first codebook.

In an implementation, the first codebook is determined according to received signaling.

In an implementation, when determining the first codebook according to the received signaling, the processor is further configured to read the program in the memory 1620 to perform: determining each pre-coding matrix in the first codebook according to the received signaling when the subsets are independent of each other; or, determining each pre-coding matrix in the first codebook according to a part of the pre-coding matrixes indicated in the received signaling when a mapping relationship exists between different subsets.

In an implementation, the signaling higher-layer signaling or physical-layer signaling.

In an implementation, calculating the channel state information according to the first codebook includes: calculating the channel state information on an assumption that data to be transmitted is preprocessed by using all or a part of the pre-coding matrixes in the first codebook over resources for transmitting the data.

In an implementation, calculating the channel state information on the assumption that the data to be transmitted is preprocessed by using all or the part of the pre-coding matrixes in the first codebook over the resources for transmitting the data includes: calculating the channel state information on the assumption that the data to be transmitted is preprocessed by using all or the part of the pre-coding matrixes in the first codebook alternately over the resources for transmitting the data.

In an implementation, the first codebook includes R sub-sets Zn. Zn is a set of pre-coding matrixes each having n columns, and R is a natural number. Calculating the channel state information on the assumption that the data to be transmitted is preprocessed by using all or the part of the pre-coding matrixes in the first codebook alternately over the resources for transmitting the data includes: calculating the channel state information according to quantities of columns of all or the part of the pre-coding matrixes in the first codebook, respectively, where when calculating the channel state information according to a quantity n of columns, assuming that the data is to be transmitted over M resources, and that the data is preprocessed by using all or a part of the pre-coding matrixes in Zn alternately over the M resources. M is a positive integer more than or equal to 1.

In an implementation, R is a largest quantity of data stream layers that can be supported during transmission of the data and is determined according to transmission capacities of the base station and the terminal.

In an implementation, the processor is further configured to read the program in the memory to perform: calculating the channel state information according to all subsets in the first codebook, and determining a quantity of columns of each pre-coding matrix in a subset with a highest transmission capacity as a first rank indicator; or determining the first rank indicator according to an SINR or based on singular value decomposition.

Here in FIG. 16, the bus architecture can include any number of interconnecting buses and bridges to particularly link together various circuits including one or more processors represented by the processor 1600, and one or more memories represented by the memory 1620. The bus architecture can further link together various other circuits, e.g., peripherals, manostats, power management circuits, etc., all of which are well known in the art, so a further description thereof is omitted herein. The bus interface serves as an interface. The transceiver 1610 can be a number of elements including a transmitter and a receiver, which are units for communication with various other devices over a transmission medium. For different terminals, the user interface 1630 can also be an interface via which a necessary device is connected internally or externally, where the connected device includes but is not limited to a keypad, a display, a loudspeaker, a microphone, a joystick, etc.

The processor 1600 is responsible for managing the bus architecture and performing normal processes, and the memory 1620 can store data for use by the processor 1600 in performing the operations.

Figure 17:
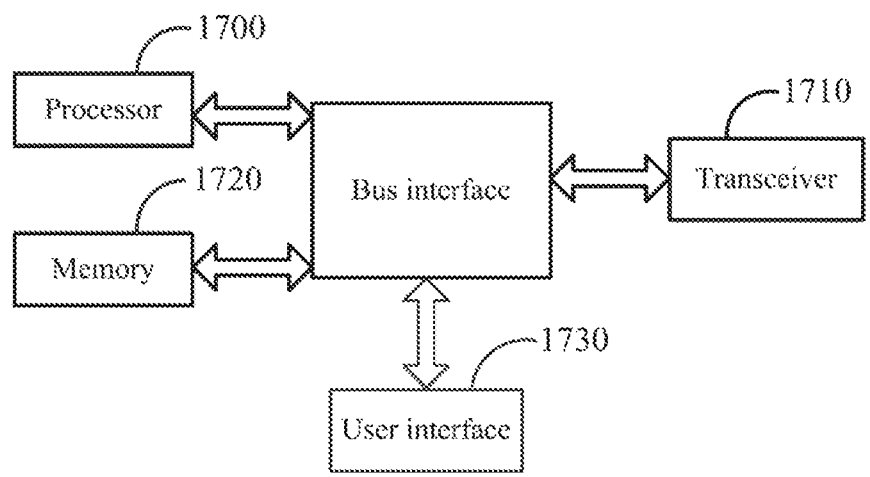
FIG. 17 is a schematic structural diagram of a second terminal according to an embodiment of the disclosure.

FIG. 17 is a schematic structural diagram of a second terminal. As illustrated, the terminal can include a processor 1700, a transceiver 1710 and a memory 1720.

The processor 1700 is configured to read a program in the memory 1720 to perform: determining a pre-coding matrix in a second codebook, and determining a sub-codebook associated with the pre-coding matrix as a third codebook, where the second codebook is a set of elements, the elements are pre-coding matrixes, and each of the pre-coding matrixes has an associated sub-codebook; and calculating channel state information according to the determined pre-coding matrix and the third codebook.

The transceiver 1710 is configured to be controlled by the processor 1700 to transmit information about the determined pre-coding matrix and the channel state information to a base station.

In an implementation, determining the pre-coding matrix in the second codebook includes: for each pre-coding matrix in the second codebook, calculating a corresponding performance index on an assumption that data to be transmitted is preprocessed by using the pre-coding matrix; and determining a pre-coding matrix according to values of the performance indexes corresponding to each of the pre-coding matrixes in the second codebook; or for each pre-coding matrix in the second codebook: calculating a performance index corresponding to a sub-codebook associated with the pre-coding matrix on an assumption that the data to be transmitted is preprocessed by using pre-coding matrixes in the sub-codebook and determining a pre-coding matrix according to values of the performance indexes corresponding to the sub-codebooks associated with each of the pre-coding matrixes.

In an implementation, when assuming that the data to be transmitted is preprocessed by using pre-coding matrixes in a sub-codebook, assuming that the data to be transmitted is preprocessed by using the pre-coding matrixes in the sub-codebook alternately over resources for transmitting the data, or assuming that the data to be transmitted is preprocessed by using the pre-coding matrixes in the sub-codebook over the resources for transmitting the data, respectively.

In an implementation, the processor is further configured to read the program in the memory to perform: when the third codebook includes a plurality of pre-coding matrixes having different quantities of columns, then determining a second rank indicator and returning the second rank indicator to the base station. The second rank indicator is determined according to a channel from the base station to the terminal. Or the second rank indicator is determined by: for each possible quantity of columns of the pre-coding matrixes in the third codebook, calculating a transmission capacity according to the quantity of columns in the third codebook on an assumption that data to be transmitted is preprocessed by using a pre-coding matrix having the quantity of columns in the third codebook, and selecting a quantity of columns with a highest transmission capacity as the second rank indicator.

Here in FIG. 17, the bus architecture can include any number of interconnecting buses and bridges to particularly link together various circuits including one or more processors represented by the processor 1700, and one or more memories represented by the memory 1720. The bus architecture can further link together various other circuits, e.g., peripherals, manostats, power management circuits, etc., all of which are well known in the art, so a further description thereof is omitted herein. The bus interface serves as an interface. The transceiver 1710 can be a number of elements including a transmitter and a receiver, which are units for communication with various other devices over a transmission medium. For different terminals, the user interface 1730 can also be an interface via which a necessary device is connected internally or externally, where the connected device includes but is not limited to a keypad, a display, a loudspeaker, a microphone, a joystick, etc.

The processor 1700 is responsible for managing the bus architecture and performing normal processes, and the memory 1720 can store data for use by the processor 1700 in performing the operations.

Figure 18:
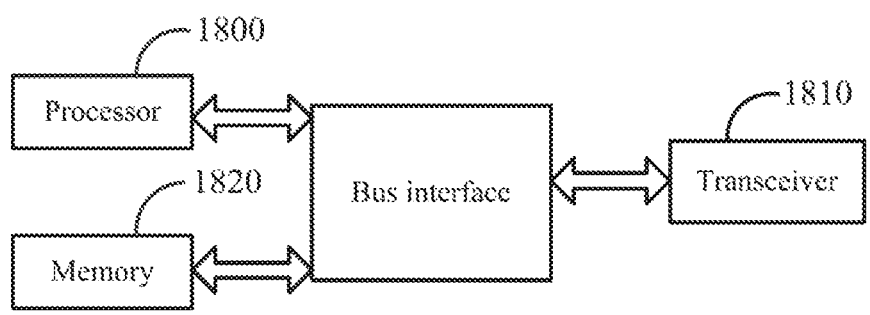
FIG. 18 is a schematic structural diagram of a second base station according to an embodiment of the disclosure.

FIG. 18 is a schematic structural diagram of a second base station. As illustrated, the base station can include a processor 180, a transceiver 1810 and a memory 1820.

The processor 1800 is configured to read a program in the memory 1820 to perform: determining a third codebook according to information related to a pre-coding matrix and channel state information; and preprocessing data to be transmitted by using a part or all of the pre-coding matrixes in the third codebook over resources allocated for the terminal before transmission of the data.

The transceiver 1810 is configured to be controlled by the processor 1800 to: receive the information related to the pre-coding matrix and the channel state information, fed back by the terminal; and transmit the data to the terminal.

In an implementation, preprocessing the data to be transmitted by using the part or all of the pre-coding matrixes in the third codebook includes: preprocessing the data to be transmitted by using the part or all of the pre-coding matrixes in the third codebook alternately.

In an implementation, preprocessing the data to be transmitted by using the part or all of the pre-coding matrixes in the third codebook includes: preprocessing the data to be transmitted by using the part or all of the pre-coding matrixes in the third codebook alternately.

In an implementation, when the third codebook comprises a plurality of pre-coding matrixes having different quantities of columns, the processor is further configured to read the program in the memory to perform: receiving a second rank indicator fed back by the terminal; and after the pre-coding matrix is determined in the second codebook according to the information related to the pre-coding matrix, determining pre-coding matrixes, each having a quantity of columns equal to the second rank indicator, in a sub-codebook associated with the pre-coding matrix as the third codebook.

Here in FIG. 18, the bus architecture can include any number of interconnecting buses and bridges to particularly link together various circuits including one or more processors represented by the processor 1800, and one or more memories represented by the memory 1820. The bus architecture can further link together various other circuits, e.g., peripherals, manostats, power management circuits, etc., all of which are well known in the art, so a further description thereof is omitted herein. The bus interface serves as an interface. The transceiver 1810 can be a number of elements including a transmitter and a receiver, which are units for communication with various other devices over a transmission medium. The processor 1800 is responsible for managing the bus architecture and performing normal processes, and the memory 1820 can store data for use by the processor 1800 in performing the operations.

Figure 19:
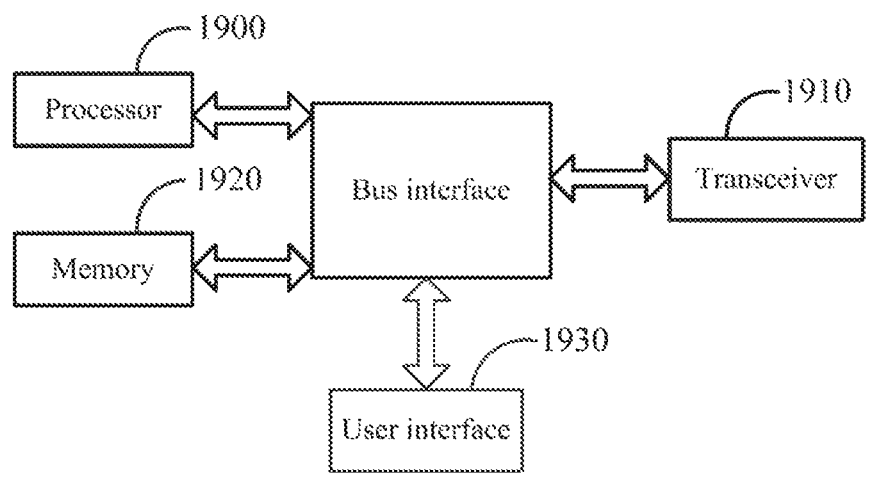
FIG. 19 is a schematic structural diagram of a third terminal according to an embodiment of the disclosure.

FIG. 19 is a schematic structural diagram of a third terminal, and as illustrated, the terminal can include: a processor 1900, a transceiver 1910 and a memory 1920.

The processor 1900 is configured to read a program in the memory 1920 to perform: calculating channel state information according to a fourth codebook. The fourth codebook is a set of elements and each of the elements is a set of pre-coding matrixes.

The transceiver 1910 is configured to be controlled by the processor 1900 to feed back the channel state information.

In an implementation, calculating the channel state information according to the fourth codebook includes: calculating the channel state information on an assumption that data is preprocessed by using a set of pre-coding matrixes in the fourth codebook over resources for transmitting the data.

In an implementation, calculating the channel state information on the assumption that the data is preprocessed by using the set of pre-coding matrixes in the fourth codebook over the resources for transmitting the data includes: calculating the channel state information on an assumption that the data is preprocessed by using pre-coding matrixes in the set of pre-coding matrixes alternately over the resources for transmitting the data.

In an implementation, the channel state information is a CQI, a set of pre-coding matrixes corresponding to the CQI is one of the sets of pre-coding matrixes in the fourth codebook, and data is assumed to be preprocessed by using all or a part of the pre-coding matrixes in the set of pre-coding matrixes over resources for transmitting the data.

Or the channel state information is indication information of a set of pre-coding matrixes, the indication information of the set of pre-coding matrixes is an index of one of the sets of pre-coding matrixes in the fourth codebook and the set of pre-coding matrixes is a recommended set of pre-coding matrixes in the fourth codebook.

In an implementation, the processor is further configured to read the program in the memory to perform: when pre-coding matrixes in different sets of pre-coding matrixes in the fourth codebook have different quantities of columns, then: determining a third rank indicator and feeding back the third rank indicator, where the third rank indicator and indication information of a set of pre-coding matrixes jointly correspond to one of the sets of pre-coding matrixes in the fourth codebook; or indicating one of the sets of pre-coding matrixes in the fourth codebook by using the indication information of the set of pre-coding matrixes.

Here in FIG. 19, the bus architecture can include any number of interconnecting buses and bridges to particularly link together various circuits including one or more processors represented by the processor 1900, and one or more memories represented by the memory 1920. The bus architecture can further link together various other circuits, e.g., peripherals, manostats, power management circuits, etc., all of which are well known in the art, so a further description thereof is omitted herein. The bus interface serves as an interface. The transceiver 1910 can be a number of elements including a transmitter and a receiver, which are units for communication with various other devices over a transmission medium. For different terminals, the user interface 1930 can also be an interface via which a necessary device is connected internally or externally, where the connected device includes but is not limited to a keypad, a display, a loudspeaker, a microphone, a joystick, etc.

The processor 1900 is responsible for managing the bus architecture and performing normal processes, and the memory 1920 can store data for use by the processor 1900 in performing the operations.

Figure 20:
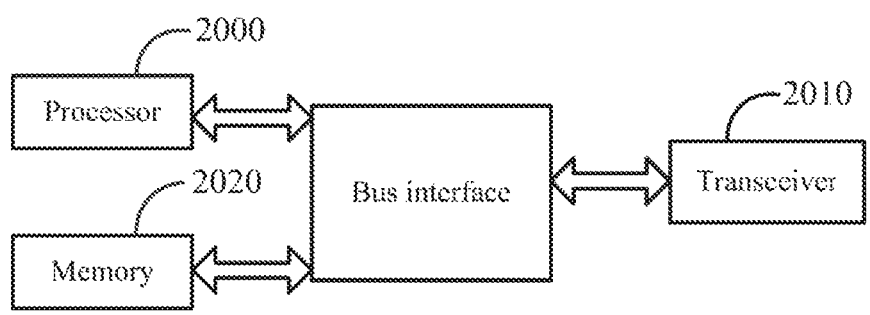
FIG. 20 is a schematic structural diagram of a third base station according to an embodiment of the disclosure.

FIG. 20 is a schematic structural diagram of a third base station. As illustrated, the base station can include: a processor 2000, a transceiver 2010 and a memory 2020.

The processor 2000 is configured to read a program in the memory 2020 to perform: determining a set of pre-coding matrixes in a fourth codebook according to channel state information; and transmitting data to a terminal, where the data to be transmitted is preprocessed by using the pre-coding matrixes in the set over resources allocated for the terminal before transmission of the data.

The transceiver 2010 is configured to be controlled by the processor 2000 to receive the returned channel state information.

In an implementation, when preprocessing the data by using the pre-coding matrixes in the set of pre-coding matrixes, the processor is configured to read the program in the memory to perform: preprocessing the data by using the pre-coding matrixes in the set of pre-coding matrixes alternately.

In an implementation, the channel state information is a. CQI, and a set of pre-coding matrixes corresponding to the CQI is a set of pre-coding matrixes in the fourth codebook. The processor preprocesses the data by using all or a part of the pre-coding matrixes in the set of pre-coding matrixes alternately over the resources for transmitting the data.

Or the channel state information is indication information of a set of pre-coding matrixes, the indication information of the set of pre-coding matrixes is an index of a set of pre-coding matrixes in the fourth codebook, and the set of pre-coding matrixes is a set of pre-coding matrixes having a highest CQI in the fourth codebook, or a set of pre-coding matrixes having a CQI mapped to a highest throughout in the fourth codebook.

In an implementation, the processor is further configured to read the program in the memory to perform: when pre-coding matrixes of different sets of pre-coding matrixes in the fourth codebook have different quantities of columns, then: receiving a third rank indicator, where the third rank indicator and indication information of a set of pre-coding matrixes jointly correspond to one of the sets of pre-coding matrixes in the fourth codebook; or determining one of the sets of pre-coding matrixes in the fourth codebook according to the indication information of the set of pre-coding matrixes.

Here in FIG. 20, the bus architecture can include any number of interconnecting buses and bridges to particularly link together various circuits including one or more processors represented by the processor 2000, and one or more memories represented by the memory 2020. The bus architecture can further link together various other circuits, e.g., peripherals, manostats, power management circuits, etc., all of which are well known in the art, so a further description thereof is omitted herein. The bus interface serves as an interface. The transceiver 2010 can be a number of elements including a transmitter and a receiver, which are units for communication with various other devices over a transmission medium. The processor 2000 is responsible for managing the bus architecture and performing normal processes, and the memory 2020 can store data for use by the processor 2000 in performing the operations.

In summary, the embodiments of the disclosure provide an open-loop MIMO transmission solution applicable to antenna arrays. According to the embodiments of the disclosure, the base station determines a set of pre-coding matrixes, and sends it to the terminal via signaling, so that the terminal calculates channel state information of open-loop MIMO. Or the terminal determines an associated sub-codebook of a pre-coding matrix in a codebook, feeds back information about the pre-coding matrix and calculates channel state information of open-loop MIMO according to the associated sub-codebook.

The technical solutions according to the embodiments of the disclosure can determine the pre-coding matrix required for calculation in open-loop MIMO without traversing the entire space, thereby lowering the difficulty of designing and implementing the system, and improving the performance of the system.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure, it shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coining into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

We claim:

1. A method for providing feedback channel state information, the method comprising:
   calculating channel state information according to a first codebook, wherein the first codebook includes a set of elements and each of the elements includes a set of pre-coding matrixes; and
   providing feedback of the channel state information;
   wherein the channel state information is a channel quality indicator (CQI), a set of pre-coding matrixes corresponding to the CQI is one of the sets of pre-coding matrixes in the first codebook, and data is assumed to be preprocessed by using all or a part of the pre-coding matrixes in the set of pre-coding matrixes over resources for transmitting the data.

2. The method according to claim 1, wherein the calculating of the channel state information according to the first codebook further comprises:
   calculating the channel state information based on the assumption that the data is preprocessed by using at least one of the sets of pre-coding matrixes in the first codebook over resources for transmitting the data.

3. The method according to claim 2, wherein the calculating of the channel state information based on the assumption that the data is preprocessed by using the set of pre-coding matrixes in the first codebook over the resources for transmitting the data further comprises:
   calculating the channel state information based on an assumption that the data is preprocessed by using the pre-coding matrixes in the set of pre-coding matrixes alternately over the resources for transmitting the data.

4. The method according to claim 1, further comprising:
   when pre-coding matrixes in different sets of pre-coding matrixes in the first codebook have different quantities of columns, then:
   determining a first rank indicator and providing feedback of the first rank indicator, wherein the first rank indicator and indication information of at least one of the sets of pre-coding matrixes jointly correspond to one of the sets of pre-coding matrixes in the first codebook.

5. The method according to claim 1, further comprising:
   when pre-coding matrixes in different sets of pre-coding matrixes in the first codebook have different quantities of columns, then:
   indicating one of the sets of pre-coding matrixes in the first codebook by using the indication information of the set of pre-coding matrixes.

6. An apparatus for providing feedback of channel state information, the apparatus comprising:
   a transmitter;
   a processor; and
   a memory for storing at least one instruction and in communication with the processor, wherein the processor is configured to execute the at least one instruction to:
   calculate channel state information according to a first codebook, wherein the first codebook has a set of elements and each of the elements are a set of pre-coding matrixes; and
   control the transmitter to provide feedback to the channel state information;
   wherein the channel state information is a channel quality indicator (CQI), a set of pre-coding matrixes corresponding to the CQI is one of the sets of pre-coding matrixes in the first codebook, and the processor is further configured to execute the at least one instruction to calculate the channel state information on an assumption that data is preprocessed by using all or a part of the pre-coding matrixes in the set of pre-coding matrixes over resources for transmitting the data.

7. The apparatus according to claim 6, wherein the processor is further configured to execute the at least one instruction to calculate the channel state information on the assumption that the data is preprocessed by using a set of pre-coding matrixes in the first codebook over resources for transmitting the data.

8. The apparatus according to claim 7, wherein the processor is further configured to execute the at least one instruction to calculate the channel state information on an assumption that the data is preprocessed by using pre-coding matrixes in the set of pre-coding matrixes alternately over the resources for transmitting the data.

9. The apparatus according to claim 6, wherein when pre-coding matrixes in different sets of pre-coding matrixes in the first codebook have different quantities of columns, the processor is further configured to execute the at least one instruction to:
   determine a first rank indicator and control the transmitter to feed the first rank indicator back to the base station when feeding the channel state information back to the base station, wherein the first rank indicator and indication information of a set of pre-coding matrixes jointly correspond to one of the sets of pre-coding matrixes in the first codebook.

10. The apparatus according to claim 6, wherein when pre-coding matrixes in different sets of pre-coding matrixes in the first codebook have different quantities of columns, the processor is further configured to execute the at least one instruction to:
    indicate one of the sets of pre-coding matrixes in the first codebook by using the indication information of the set of pre-coding matrixes.

* * * * *